United States Patent
Manolakos et al.

(10) Patent No.: US 11,456,925 B2
(45) Date of Patent: *Sep. 27, 2022

(54) ADAPTIVE SCALABLE NUMEROLOGY FOR HIGH SPEED TRAIN SCENARIOS

(71) Applicant: QUALCOMM Incorporated, San Diego, CA (US)

(72) Inventors: Alexandros Manolakos, San Diego, CA (US); Jing Jiang, San Diego, CA (US); June Namgoong, San Diego, CA (US); Joseph Binamira Soriaga, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 16/909,666

(22) Filed: Jun. 23, 2020

(65) Prior Publication Data

US 2020/0322222 A1 Oct. 8, 2020

Related U.S. Application Data

(63) Continuation of application No. 15/477,955, filed on Apr. 3, 2017, now Pat. No. 10,715,392.
(Continued)

(51) Int. Cl.
*H04L 41/0896* (2022.01)
*H04L 1/00* (2006.01)
(Continued)

(52) U.S. Cl.
CPC ........ *H04L 41/0896* (2013.01); *H04L 1/0001* (2013.01); *H04L 1/0006* (2013.01);
(Continued)

(58) Field of Classification Search
CPC . H04L 41/0896; H04L 1/0001; H04L 1/0006; H04L 27/2607; H04L 5/003;
(Continued)

(56) References Cited

U.S. PATENT DOCUMENTS 8,472,424 B2 6/2013 Bhushan et al.
8,509,791 B2 8/2013 Damnjanovic
(Continued)

FOREIGN PATENT DOCUMENTS

CN 1909534 A 2/2007
EP 3214869 A1 9/2017
(Continued)

OTHER PUBLICATIONS

"3rd Generation Partnership Project; Technical Specification Group Radio Access Network; Study on Performance Enhancements for High Speed Scenario in LTE (Release 13)", 3GPP Standard; 3GPP TR 36.878, 3rd Generation Partnership Project (3GPP), Mobile Competence Centre, 650, Route Des Lucioles, F-06921, Sophia-Antipolis Cedex, France, vol. RAN WG4, No. V13.0.0, Jan. 7, 2016, pp. 1-92, XP051294852, [retrieved on Jan. 7, 2016].
(Continued)

*Primary Examiner* — Jae Y Lee
(74) *Attorney, Agent, or Firm* — Arent Fox LLP

(57) ABSTRACT

The present disclosure provides for adaptive resource management in new radio operations that adapts a numerology including a subcarrier spacing and/or cyclic prefix for a user equipment (UE) traveling at a high speed. A base station may transmit via a plurality of remote radio heads (RRH) to a user equipment (UE) is moving along a high speed track. The base station may transmit, in a first time period, using a first numerology including a first subcarrier spacing and a first cyclic prefix ratio, a first transmission for the UE. The base station may transmit, in a subsequent time period, using
(Continued)

a second numerology including a second subcarrier spacing and a second cyclic prefix ratio, a second transmission for the UE. At least one of the second subcarrier spacing is different than the first subcarrier spacing or the second cyclic prefix ratio is different than the first cyclic prefix ratio.

28 Claims, 10 Drawing Sheets

Related U.S. Application Data

(60) Provisional application No. 62/401,672, filed on Sep. 29, 2016.

(51) Int. Cl.
*H04L 27/26* (2006.01)
*H04W 64/00* (2009.01)
*H04W 72/00* (2009.01)
*H04L 5/00* (2006.01)
*H04W 84/00* (2009.01)
*H04W 88/08* (2009.01)

(52) U.S. Cl.
CPC ....... *H04L 27/2607* (2013.01); *H04W 64/006* (2013.01); *H04W 72/005* (2013.01); *H04L 5/003* (2013.01); *H04W 84/005* (2013.01); *H04W 88/085* (2013.01)

(58) Field of Classification Search
CPC ............. H04W 64/006; H04W 72/005; H04W 84/005; H04W 88/085
See application file for complete search history.

(56) References Cited

U.S. PATENT DOCUMENTS

| | | | |
|---|---|---|---|
| 8,565,082 B1 | 10/2013 | Vargantwar et al. | |
| 10,715,392 B2* | 7/2020 | Manolakos | H04W 64/006 |
| 2011/0038430 A1* | 2/2011 | Yoshimoto | H04L 5/0046 |
| | | | 375/259 |
| 2012/0014392 A1 | 1/2012 | Bhushan et al. | |
| 2013/0195002 A1 | 8/2013 | Walker et al. | |
| 2014/0078920 A1 | 3/2014 | Tandra et al. | |
| 2015/0215148 A1 | 7/2015 | Taori et al. | |
| 2016/0020891 A1 | 1/2016 | Jung et al. | |
| 2016/0352551 A1* | 12/2016 | Zhang | H04L 27/26025 |
| 2017/0126358 A1* | 5/2017 | Rong | H04L 1/0038 |
| 2017/0331670 A1 | 11/2017 | Parkvall et al. | |

FOREIGN PATENT DOCUMENTS

| | | |
|---|---|---|
| WO | 2007098450 | 8/2007 |
| WO | 2008115897 | 9/2008 |
| WO | 2016068072 A1 | 5/2016 |
| WO | 2016192644 A1 | 12/2016 |

OTHER PUBLICATIONS

International Search Report and Written Opinion—PCT/US2017/048014—ISA/EPO—dated Oct. 27, 2017.
NTT DOCOMO Inc: "Workplan for Study on NR Access Technology", 3GPP TSG RAN WG1 Meeting #86, R1-167373, Goteborg, Sweden, Aug. 22-26, 2016, pp. 1-30.

* cited by examiner

ADAPTIVE SCALABLE NUMEROLOGY FOR HIGH SPEED TRAIN SCENARIOS

CLAIM OF PRIORITY UNDER 35 U.S.C. § 119

The present Applications for Patent is a continuation of U.S. patent application Ser. No. 15/477,955 entitled "ADAPTIVE SCALABLE NUMEROLOGY FOR HIGH SPEED TRAIN SCENARIOS" filed Apr. 3, 2017, which claims priority to Provisional Application No. 62/401,672 entitled "ADAPTIVE SCALABLE NUMEROLOGY FOR HIGH SPEED TRAIN SCENARIOS" filed Sep. 29, 2016, both of which are assigned to the assignee hereof, and incorporated herein by reference in their entirety.

BACKGROUND

Aspects of this disclosure relate generally to telecommunications, and more particularly to resource management in wireless communication systems.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, 5G new radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information. As the demand for mobile broadband access continues to increase, however, there exists a need for further improvements in 5G communications technology and beyond. Preferably, these improvements should be applicable to other multi-access technologies and the telecommunication standards that employ these technologies.

It is envisaged that 5G NR will, in some cases, be deployed to provide network connectivity to users on high speed trains (HST). A HST network deployment presents unique challenges due to the potential for a large number of users on the train and the high mobility of the users as the train moves at full speed. It would be desirable for a HST network deployment to provide network capacity improvements for 5G communications technology in terms of, for example, spectral and energy efficiency.

SUMMARY

The present disclosure provides for adaptive resource management for high speed scenarios, particularly for high speed trains. In a high speed scenario, a UE may quickly move through the coverage area of base stations such as a remote radio head (RRH). When the UE is close to a base station, the UE may experience high delay spread between signals from different base stations and low Doppler spread. In contrast, when the UE is between base stations, the UE may experience low delay spread between signals from different base stations but high Doppler spread. In an aspect, the present disclosure provides for adaptive resource management using a scaled numerology family and adaptable cyclic prefix length to adapt to the changing conditions for a UE.

In an aspect, the disclosure provides a method of resource adaptation for wireless communications. The method may include determining, by a network device transmitting via a plurality of remote radio heads (RRH) that a user equipment (UE) is moving along a high speed track. The method may include transmitting, in a first time period, using a first numerology including a first subcarrier spacing and a first cyclic prefix ratio, a first transmission for the UE. The method may include transmitting, in a subsequent time period, using a second numerology including a second subcarrier spacing and a second cyclic prefix ratio, a second transmission for the UE. At least one of the second subcarrier spacing may be different than the first subcarrier spacing or the second cyclic prefix ratio may be different than the first cyclic prefix ratio.

In another aspect, the disclosure provides an apparatus for resource adaptation in wireless communications. The apparatus may include a processor, a transceiver communicatively coupled to a plurality of remote radio heads, and a memory coupled to the processor. The memory may include instructions executable by the processor. The processor may be configured to determine that a UE is moving along a high speed track. The processor may be configured to transmit, in a first time period, via the plurality of RRHs, using a first numerology including a first subcarrier spacing and a first cyclic prefix ratio, a first transmission for the UE. The processor may be configured to transmit, in a subsequent time period, via the plurality of RRHs, using a second numerology including a second subcarrier spacing and a second cyclic prefix ratio, a second transmission for the UE. At least one of the second subcarrier spacing may be different than the first subcarrier spacing or the second cyclic prefix ratio may be different than the first cyclic prefix ratio.

In another aspect, the disclosure provides another apparatus for resource adaptation in wireless communications. The apparatus may include means for determining that a UE is moving along a high speed track. The apparatus may include means for transmitting, in a first time period, using a first numerology including a first subcarrier spacing and a first cyclic prefix ratio, a first transmission for the UE. The apparatus may include means for transmitting, in a subsequent time period, using a second numerology including a second subcarrier spacing and a second cyclic prefix ratio, a second transmission for the UE. At least one of the second subcarrier spacing may be different than the first subcarrier spacing or the second cyclic prefix ratio may be different than the first cyclic prefix ratio.

In another aspect, the disclosure provides a computer readable medium for resource adaptation in wireless communications. The computer readable medium may include code to determine, by a network device transmitting via a plurality of remote radio heads (RRH) that a user equipment (UE) is moving along a high speed track. The computer readable medium may include code to transmit, in a first time period, using a first numerology including a first subcarrier spacing and a first cyclic prefix ratio, a first transmission for the UE. The computer readable medium may include code to transmit, in a subsequent time period, using a second numerology including a second subcarrier spacing and a second cyclic prefix ratio, a second transmission for the UE. At least one of the second subcarrier spacing may be different than the first subcarrier spacing or the second cyclic prefix ratio may be different than the first cyclic prefix ratio.

In another aspect, the disclosure provides a method of resource adaptation for wireless communications. The method may include receiving, by a UE, a first transmission in a first time period, using a first numerology including a first subcarrier spacing and a first cyclic prefix ratio. The method may include receiving, in a subsequent time period, a second transmission using a second numerology including a second subcarrier spacing and a second cyclic prefix ratio, wherein the second subcarrier spacing is different than the first subcarrier spacing or the second cyclic prefix ratio is different than the first cyclic prefix ratio. In an aspect, the method may optionally include transmitting to a base station, during the subsequent time period, an uplink transmission using the second numerology To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
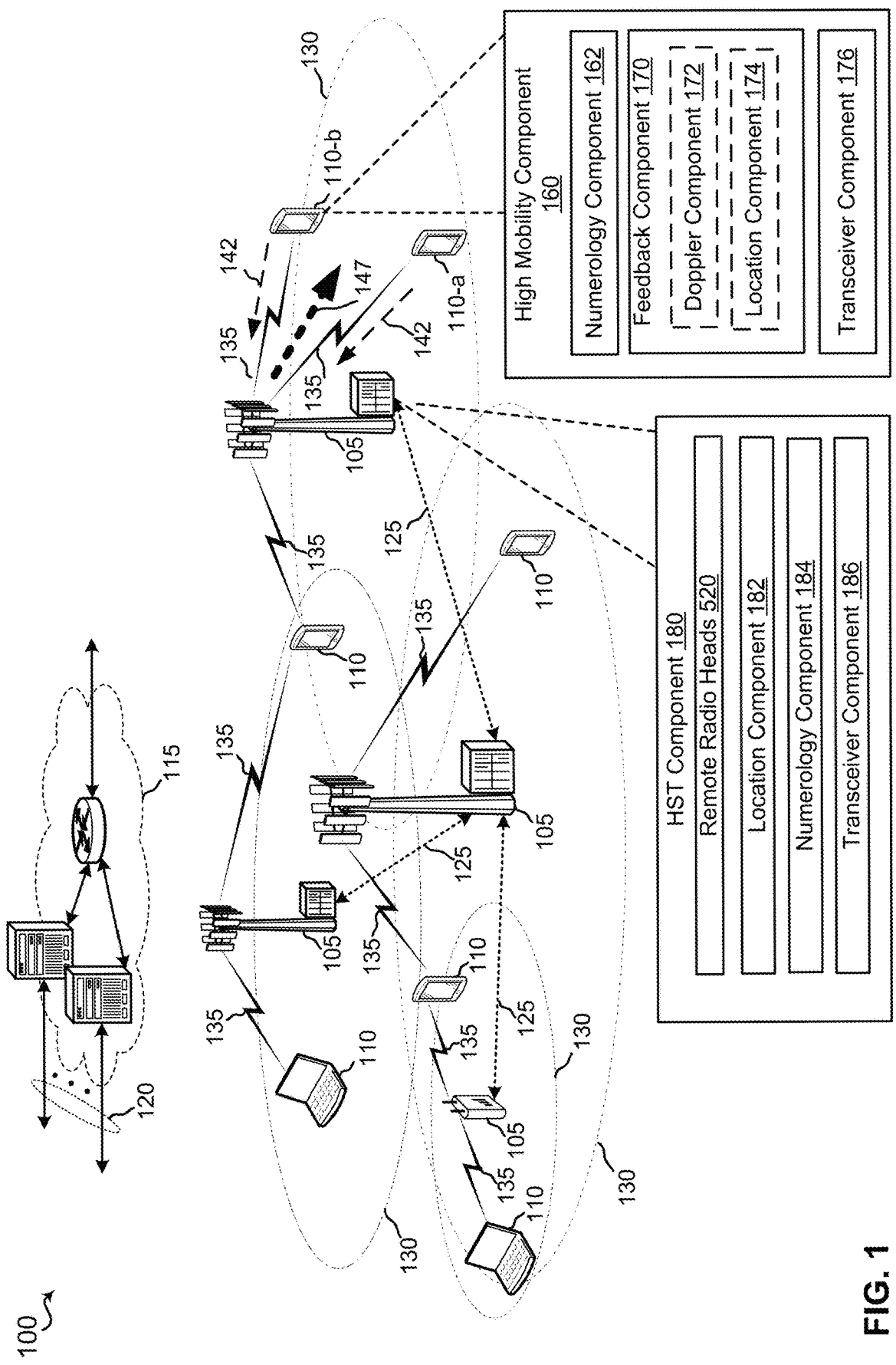
FIG. 1 is a schematic diagram of a wireless communication network in accordance with an example implementation of the present disclosure.

As discussed above, emerging 5G or New Radio (NR) communications technology, may be deployed to provide network connectivity for a High Speed Train (HST) network. In a high speed scenario, such as on a high speed train, a UE may be travelling at speeds up to 500 kilometers per hour (km/h). In order to facilitate communications along such infrastructure, a network operator may provide a single frequency network (SFN) deployment along the track using multiple remote radio heads (RRH). Multiple RRHs may be connected to a single base-band unit (BBU) and transmit synchronized radio-frequency signals. Such a SFN design may allow larger coverage areas and reduce the overhead of handovers. In an aspect, the RRHs may be spaced a distance (Ds) of 500 to 2000 meters apart. Traveling at high speeds, a UE may traverse the coverage area of an RRH on the order of 4-16 seconds. When the UE is close to a RRH, the UE may experience high delay spread between signals from different RRHs and low Doppler spread. In contrast, when the UE is between RRHs, the UE may experience low delay spread between signals from different RRHs but high Doppler spread.

A HST network deployment may result in the UE experiencing rapidly changing channel conditions. In an aspect, the present disclosure provides for adaptation of a numerology based on the changing conditions of a HST network deployment in order to improve communications between a network and high speed UE. For example, the present disclosure provides for adapting a subcarrier spacing (SCS) of a base numerology using a scaled numerology. By scaling the numerology, the effects of Doppler spread may be mitigated. The present disclosure also provides for adaptation of a cyclic prefix (CP) ratio. By adapting the CP ratio, the effects of delay spread may be mitigated even when using a scaled numerology having a larger SCS and shorter symbol period.

In an aspect, the present disclosure provides for adaptive resource management that uses scaled numerologies and adaptable cyclic prefix length to adapt to the changing conditions for a UE traveling at a high speed. Radio resources may be divided using either time division multiplexing (TDM) or frequency division multiplexing (FDM) to attempt to match a UE with a numerology and cyclic prefix length for current channel conditions.

Various aspects are now described in more detail with reference to the FIGS. 1-12. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one base station 105 including a HST component 180 configured to perform one or more techniques described herein. A UE 110 having a high mobility component 160 configured to perform similar or complementary techniques described herein at the UE 110.

In an aspect, one or more base stations 105 may include a HST component 180 for configuring the base station for a HST deployment. The HST component 180 may include or control a plurality of remote radio heads (RRH) 520 (See FIGS. 5 and 12 below). The base station 105 and/or the RRH may be considered a network device. An RRH may include a radio transceiver and/or RF front end under control of the base station that is located remotely from the base station 105. For example, the plurality of RRHs 520 may be located along a HST track to provide a coverage area that extends along the length of the track. The plurality of RRHs 520 may each receive the same base band signals from the base station 105 and transmit the same radio-frequency (RF) signals. Accordingly, the plurality of RRHs may form a single frequency network (SFN). That is, a UE within the coverage area of the RRHs may receive the RF signals without needing to identify a particular RRH transmitting the RF signal.

The HST component 180 may further include a location component 182 configured to determine a location of a UE 110. For example, the location component 182 may include hardware, firmware, and/or software code executable by a processor for determining a location of a UE 110, the code comprising instructions and being stored in a memory (e.g., computer-readable medium). The location of the UE 110 may be the location of the UE at any particular time (e.g., the location corresponding to a particular radio frame, subframe, or slot). The location component 182 may determine the location of a UE 110 based on feedback from the feedback component 170. For example, the location component 182 may receive periodic GPS locations of the UE 110 and extrapolate the position of the UE 110. In an aspect, the location component 182 may determine that the UE 110 is travelling along a high speed track, for example, based on a speed of the UE 110 exceeding a threshold and the reported locations corresponding to locations along a known track. The location component 182 may extrapolate the position of the UE 110 for a future time based on the speed of the UE 110 and the locations of the known track. The location component 174 may also use reported Doppler spread and/or Doppler shift to estimate the position of the UE 110 along a train.

The HST component 180 may further include a numerology component 184. The numerology component 184 may be configured to determine a numerology for a transmission to or from the UE 110 based on the location information determined by the location component 182. For example, the location component 182 may include hardware, firmware, and/or software code executable by a processor for determining a numerology for a transmission to or from the UE 110 based on the location information, the code comprising instructions and being stored in a memory (e.g., computer-readable medium). The numerology component 184 may also determine the numerology based on the network topology. As discussed in further detail below, the topology of a HST network deployment may result in regions where different numerologies are advantageous. The numerology component 184 may include a mapping of locations to advantageous numerologies and select a numerology for a UE for a time period based on the predicted location of the UE 110 during the time period.

The HST component 180 may further include a transceiver component 186 for transmitting and receiving according to the transmission properties determined by the numerology component 184. The transceiver component 186 may, for example, control or include an RF transceiver. For example, the transceiver component 186 may include software instructions for controlling a hardware transceiver. In an aspect, the transceiver component 186 may transmit a downlink signal 147 to the UE 110 according to a numerology selected by the numerology component 184. In an aspect, the downlink signal 147 may include an indication of the selected numerology. For example, the selected numerology may be indicated in the DCI. The transceiver component 186 may receive an uplink signal 142 from a UE 110 according to the numerology selected by the numerology component 184. The high mobility component 160 at the UE 110 may include a numerology component 162 configured to receive an indication of a selected numerology for a time period. For example, the numerology component 162 may include hardware, firmware, and/or software code executable by a processor for receiving an indication of a selected numerology for a time period, the code comprising instructions and being stored in a memory (e.g., computer-readable medium). Although various numerologies have been available in OFDM systems, typically, the numerology has been static for any particular deployment and applicable to all UEs. The high mobility component 160 may be configured to detect a signaled numerology applicable to the UE 110. For example, as will be discussed in further detail below, a base station 105 may include an indication of a selected numerology in downlink control information (DCI). The numerology component 162 may apply the selected numerology when the UE 110 is receiving a downlink transmission from the base station 105 or when the UE 110 is transmitting an uplink transmission to the base station 105.

In some examples of the present disclosure, the high mobility component 160 may further include feedback component 170 for providing feedback to the base station 105 for assisting in the selection of a numerology. For example, the feedback component 170 may provide information regarding channel conditions, the location, or the speed of the UE 110. In an aspect, the feedback component 170 may include hardware, firmware, and/or software code executable by a processor for providing feedback to the base station 105 for assisting in the selection of a numerology, the code comprising instructions and being stored in a memory (e.g., computer-readable medium). In an aspect, the feedback component 170 may include a Doppler component 172 configured to determine a Doppler spread of received signals. As discussed above, the Doppler spread may be greatest when the UE 110 is near a RRH. Accordingly, a Doppler spread reported by the feedback component 170 may be used to estimate the position of the UE 110 and/or channel conditions of the UE 110. In another aspect, the feedback component 170 may include a location component 174 configured to determine a current location of the UE 110. For example, the location component 174 may determine a UE location based on a satellite based navigation system (e.g., global position system (GPS)). Although the location of the UE 110 may change rapidly, the reported location may be used to track the location of the UE and estimate a speed of the UE. The feedback component 170 may include additional components for measuring speed, acceleration, Doppler shift, Doppler spread, root-mean-square (RMS) Delay spread, maximum Delay spread, and/or channel conditions that may be useful for selecting a numerology.

Additionally, the high mobility component 160 may further include a transceiver component 176 for transmitting and receiving according to the transmission properties determined by the numerology component 162. For example, the transceiver component 176 may control or include an RF transceiver. In an aspect, the transceiver component 176 may transmit according to a numerology selected by the numerology component 162. The transceiver component 176 may receive a downlink signal 147 from the base station 105 according to the numerology selected by the numerology component 162.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, a radio transceiver, a NodeB, eNodeB (eNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G, 4G/LTE, 3G, Wi-Fi, Bluetooth, etc.), and thus there may be overlapping geographic coverage areas 130 for different communication technologies.

In some examples, the wireless communication network 100 may be or include a Long Term Evolution (LTE) or LTE-Advanced (LTE-A) technology network. The wireless communication network 100 may also be a next generation technology network, such as a 5G wireless communication network. Moreover, the wireless communication network 100 may support high frequency operations such as millimeter wave communications. In LTE/LTE-A networks, the term evolved node B (eNB) may be generally used to describe the base stations 105, while the term UE may be generally used to describe the UEs 110. The wireless communication network 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, relay base stations, and the like.

A UE 110 may be configured to establish one or more wireless communication links 135 with one or more base stations 105. The wireless communication links 135 shown in wireless communication network 100 may carry UL transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple subcarriers (e.g., waveform signals of different frequencies) modulated according to the various radio technologies described above. Each modulated signal may be sent on a different subcarrier and may carry control information (e.g., reference signals, control channels, etc.), overhead information, user data, etc. In an aspect, the communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., LTE frame structure type 1) and TDD (e.g., LTE frame structure type 2). Moreover, in some aspects, the communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers.

Figure 2:
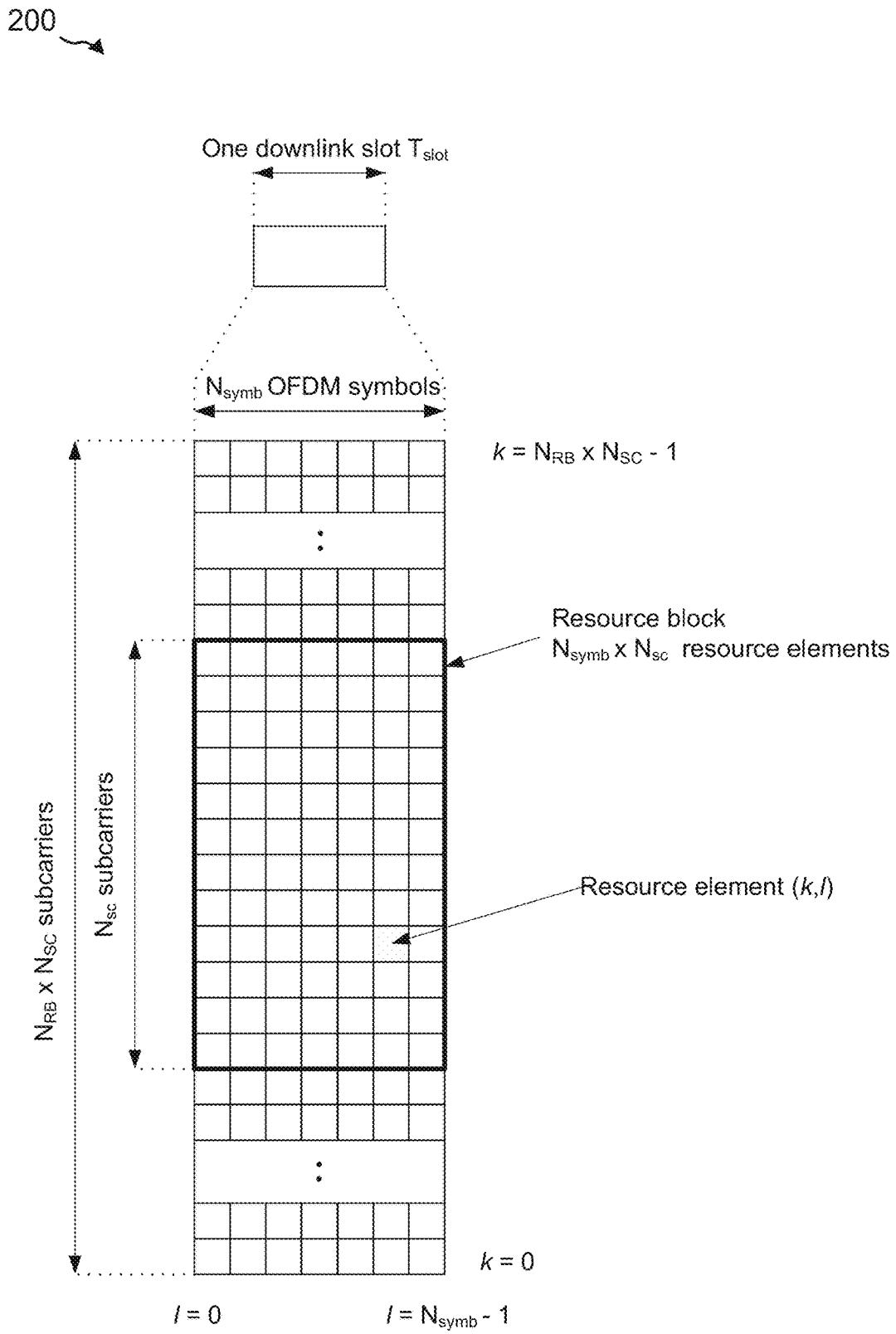
FIG. 2 illustrates an example resource grid for a downlink transmission.

FIG. 2 illustrates an example resource grid 200 for a downlink transmission. The resource grid 200 is for a downlink slot $T_{slot}$ including a number of OFDM Symbols ($N_{symb}$) in the time domain. In an aspect, each symbol may have a symbol period. A mini-slot may refer to a period of time less than $T_{slot}$ of one or more symbol periods. A UE 110 may be scheduled at a mini-slot level of granularity. A mini-slot including a plurality of symbols may span a slot boundary. In the frequency domain, the resource grid 200 is divided into a number of subcarriers ($N_{SC}$) having a subcarrier spacing (SCS). A resource element (RE) is a combination of a subcarrier (k) and a symbol (l). A physical resource block (PRB) is a group of consecutive resource elements across the $T_{slot}$. For example, a PRB may include all of the resource elements in $N_{sc}$=12 consecutive subcarriers over a slot having $N_{symb}$. The resource grid 200 may include a number of PRBs ($N_{RB}$).

In an aspect, as used herein, a numerology may refer to a combination of subcarrier spacing and cyclic prefix (CP) overhead. For 5G different transmission numerologies may be supported. The transmission numerologies may be multiplexed using frequency division multiplexing (FDM) and/or time division multiplexing (TDM). That is, some portion of the allocated bandwidth could be transmitted using one numerology and some other portion using another numerology. Similarly some symbols could be transmitted using one numerology while other symbols are transmitted using another numerology. In an aspect, a scaled numerology family means that a basic SCS, e.g., f0, is fixed for a first numerology and a second numerology scales the SCS by an integer number by keeping the same CP overhead. In a scaled numerology having twice the SCS for the second numerology as for the basic SCS, the symbol duration of the second numerology becomes exactly half of the symbol duration for the first numerology.

Scaling a numerology means that the ratio of the scaled subcarrier spacing to a nominal subcarrier spacing equals the ratio of any two positive integers. In an aspect, the ratio of the scaled subcarrier spacing to the nominal subcarrier spacing may equal the ratio of any positive integer to one or one to any positive integer. For example, scaling a numerology may include changing the subcarrier spacing by a power of 2 such that the ratio is $\frac{1}{2}\char`\^k$ or $2\char`\^k$, where k is a positive integer. A nominal subcarrier spacing may refer to a lowest subcarrier spacing allowed for a particular radio access technology (RAT). For example, a nominal subcarrier spacing may be a subcarrier spacing for a legacy RAT such as 4G/LTE. As another example, a nominal subcarrier spacing may be an agreed nominal subcarrier spacing and maybe indicated as $f_0$. A nominal subcarrier spacing may also be referred to as a base subcarrier spacing. When the subcarrier spacing is doubled, the symbol period is halved. For example, a nominal subcarrier spacing may be 15 kilohertz (KHz) ($f_0$) and scaled numerologies may have a subcarrier spacing of 30 KHz ($2 \times f_0$), 60 KHz ($4 \times f_0$), or 120 Khz ($8 \times f_0$). Such scaled numerologies may be compatible with the nominal subcarrier spacing because a time period (e.g., a time slot or subframe) may be evenly divided into a greater number of symbols.

Figure 3:
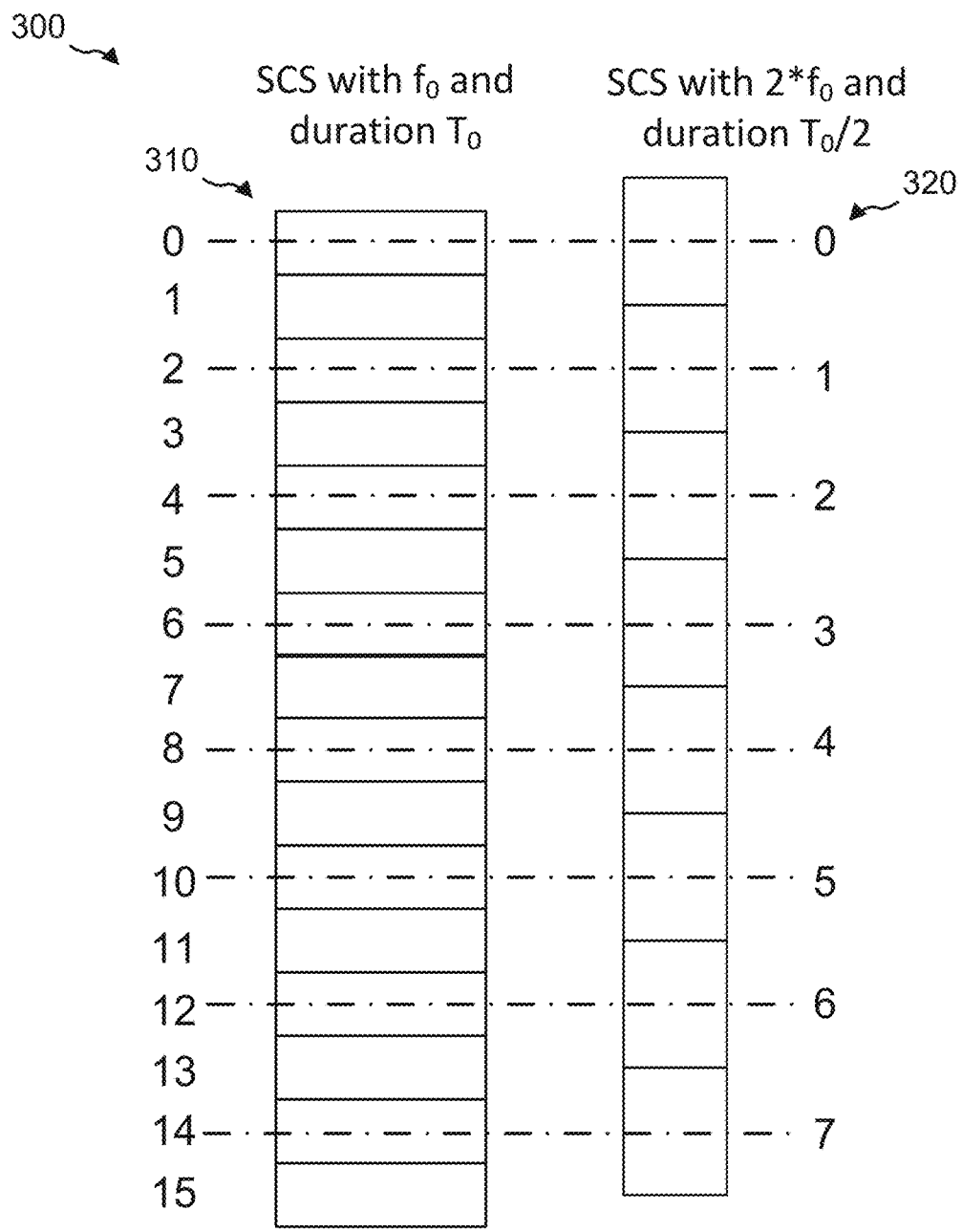
FIG. 3 is a conceptual diagram showing an example of a scaled numerology family.

FIG. 3 is a conceptual diagram 300 illustrating an example of a scaled numerology. A first numerology 310 has an SCS of $f_0$ and a symbol duration of $T_0$. A second numerology 320 has an SCS of $2*f_0$ and a symbol duration of $T_0/2$. The first numerology 310 has a subcarrier 0 that has the same center frequency as a subcarrier 0 of the second numerology 320. As illustrated, each of the even subcarriers of the first numerology 310 has the same center frequency as a corresponding subcarrier of the second numerology 320. The odd subcarriers (e.g., subcarrier 1) of the first numerology 310, however, do not match with a subcarrier of the second numerology 320. Instead, two subcarriers in the first numerology 310 use the same bandwidth as one subcarrier in the second numerology 320. The symbol duration of the second numerology, however, is half of the symbol duration of the first numerology.

A larger subcarrier spacing leads to a more robust OFDM transmission in high mobility scenarios. For example, Doppler shifts occurring due to the high mobility may be mitigated by having a larger subcarrier spacing. On the other hand, a large subcarrier spacing makes the symbol duration shorter, which may lead to a smaller cyclic prefix and a less robust OFDM transmission in deployments with high multipath. For example, in a high multipath scenario, there may be a delay spread between the paths, which may exceed the cyclic prefix duration and cause inter symbol interference.

Figure 4:
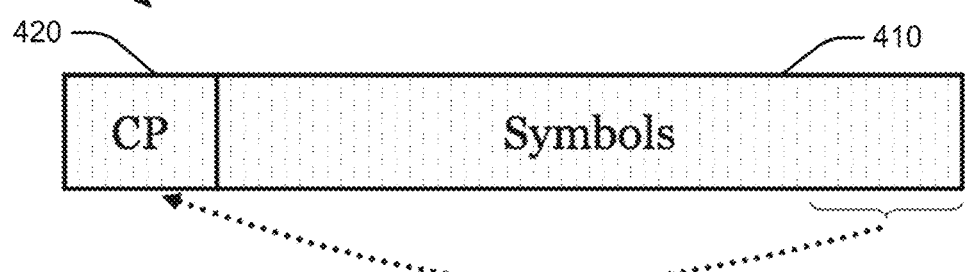
FIG. 4 is a conceptual diagram illustrating a cyclic prefix for a symbol.

FIG. 4 is a conceptual diagram 400 illustrating a cyclic prefix for a symbol. For each symbol 410 in the frequency domain, an end portion of the symbol in the time domain is copied and pre-pended to the front of the symbol to form a cyclic prefix (CP) 420. In an aspect, a cyclic prefix refers to the prefixing of a symbol with a repetition of the end. The CP 420 serves two purposes. As a guard interval, the CP 420 eliminates the intersymbol interference from the previous symbol. As a repetition of the end of the symbol, the CP 420 allows the linear convolution of a frequency-selective multipath channel to be modelled as circular convolution, which in turn may be transformed to the frequency domain using a discrete Fourier transform. This approach allows for simple frequency-domain processing, such as channel estimation and equalization. In order for the CP 420 to be effective, the length of the CP 420 must be at least equal to the length of the multipath channel. Otherwise, the excessive delay spread beyond the length of the CP 420 leads to interference and SINR ceiling.

Figure 5:
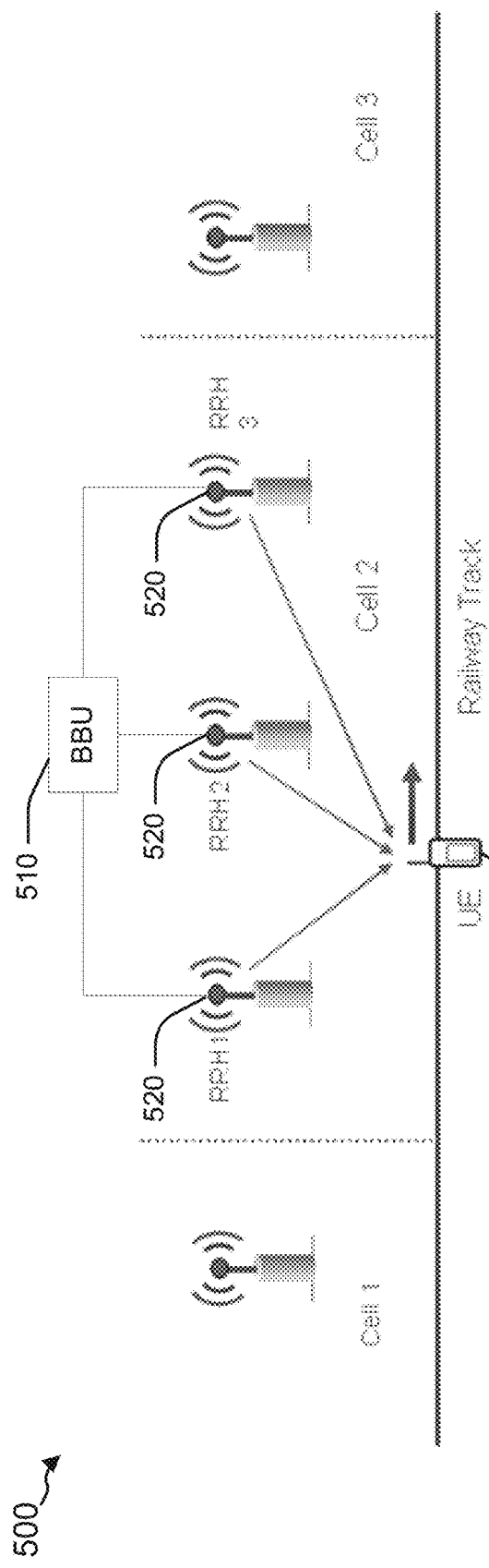
FIG. 5 is a conceptual diagram illustrating an example network deployment for a high speed train (HST)

FIG. 5 is a conceptual diagram illustrating an example network deployment 500 for a high speed train (HST). High Speed Train (HST) rail networks are expanding throughout the world and especially in Asia. A HST may travel at speeds up to 500 Km/h (~140 meters/sec). A radio network operator may deploy a single frequency network (SFN) to provide wireless network service to passengers on board the HST. For example, a passenger may carry a UE 110 on board of the HST. The network deployment 500 may include multiple remote radio heads (RRH) 520 deployed along the track. The multiple RRH 520 may be connected to a single base-band unit (BBU) 510. Accordingly, the multiple RRH 520 may transmit the same signal (e.g., IQ samples) provided by the BBU 510. The UE 110 may receive the same signal from a subset of the multiple RRH 520 as time delayed signals similar to multi-path delayed signals. The network deployment 500 using SFN may allow a relatively larger coverage area with reduced over-head of hand-over compared to single base stations.

Figure 6:
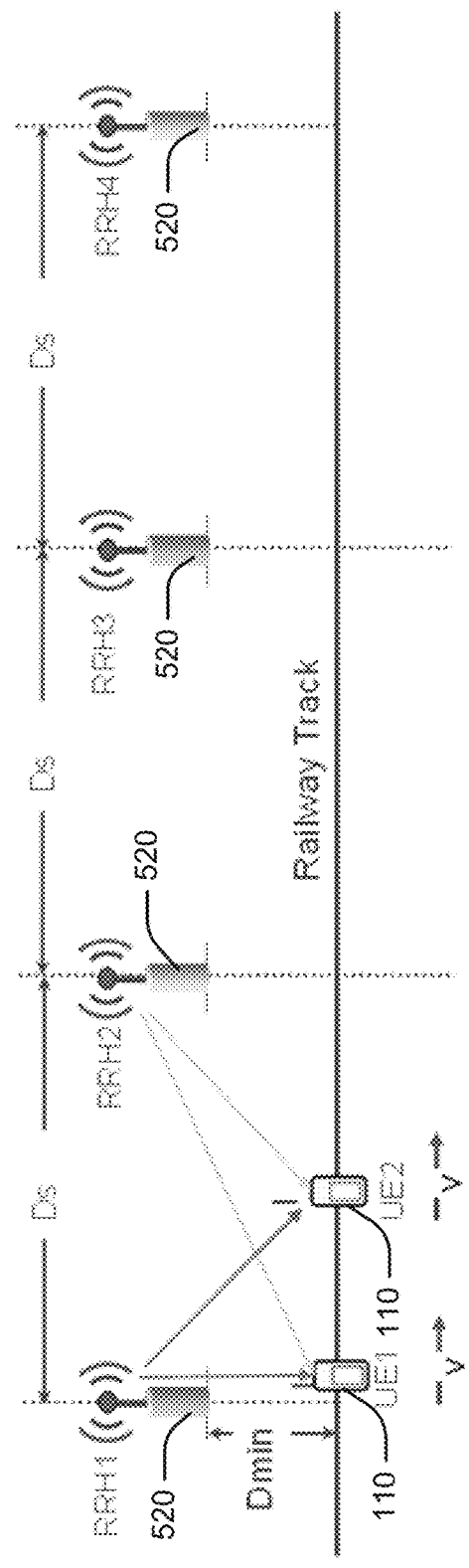
FIG. 6 is a conceptual diagram illustrating effects of delay spread and Doppler spread in a HST network deployment.

FIG. 6 is a conceptual diagram 600 illustrating effects of delay spread and Doppler spread in a HST network deployment. The RRH 520 may be spaced apart by an inter-RRH distance (Ds) of the order of 500 meters to 2000 meters. The RRH may be spaced from the railway track by a separation distance (Dmin) of the order of 5 meters to 300 meters. Today's high speed trains can be as long as 500 meters and can travel up to 500 km/h. When a UE 110 (e.g., UE1) is close to one RRH 520, the UE 110 experiences a channel with higher delay spread but lower Doppler spread. For example, the distance Dmin may remain fairly constant leading to the lower Doppler spread. Meanwhile, the difference between the distance to RRH1 and the distance to RRH2 may be at a maximum, leading to a larger delay spread between the signal transmitted from RRH1 and the signal transmitted from RRH2. In contrast, when a UE 110 (e.g., UE2) is equidistant between two RRH 520, the Doppler shift for the signal from RRH1 may be positive while the Doppler shift for the signal from RRH2 may be negative, leading to greater Doppler spread. Meanwhile, UE2 may experience little delay spread because the path length from each RRH is approximately the same.

Figure 7:
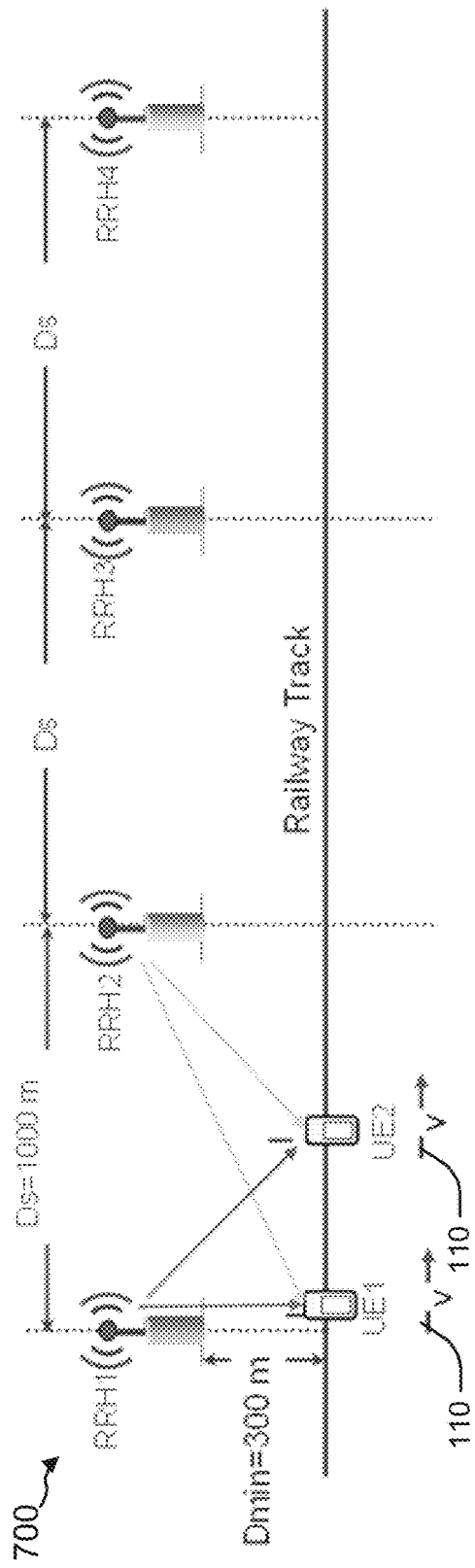
FIG. 7 a conceptual diagram illustrating the effects of varying channel conditions on a SINR.
Figure 7:
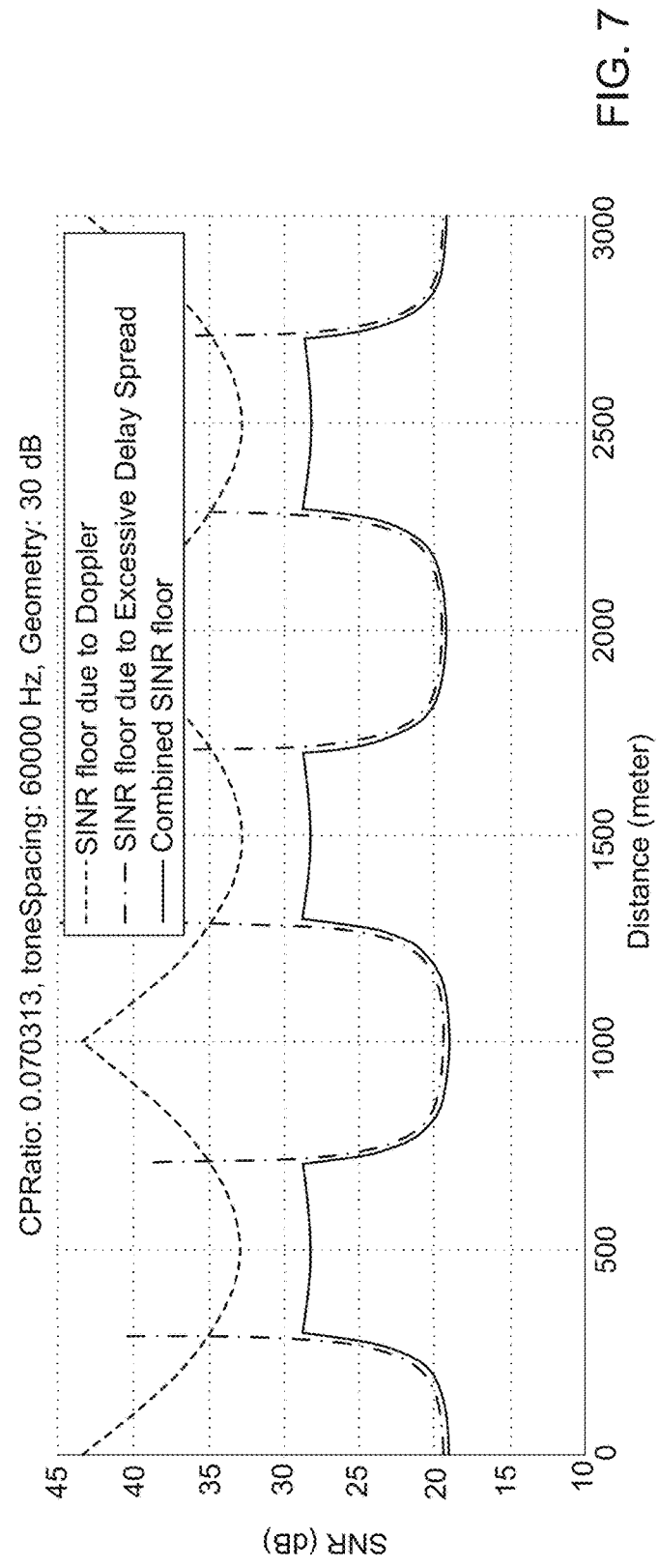

FIG. 7 is a conceptual diagram 700 illustrating the effects of varying channel conditions on a SINR. Similar to FIG. 7, the RRH 520 are illustrated as being spaced apart with Ds of 1000 meters and a Dmin of 300 meters. For this example, a cyclic prefix ratio (e.g., the ratio of CP length to symbol duration) is approximately 7%. The example numerology has a SCS of 60 KHz. The geometry is 30 dB. The lower portion of FIG. 7 charts the SINR floor due to Doppler spread, delay spread, and the combined effect. At locations close to an RRH (e.g., 0 meters, 1000 meters, 2000 meters, 3000 meters), the combined SINR floor is dominated by the SINR floor due to excessive delay spread. For example, the delay spread may be greater than the CP length and the resulting interference may limit the SINR. In areas between the RRH 520, the combined SINR floor is dominated by the Doppler spread. However, the SINR floor due to Doppler is greater than the geometry, so the combined SINR floor may remain below the geometry.

Figure 8:
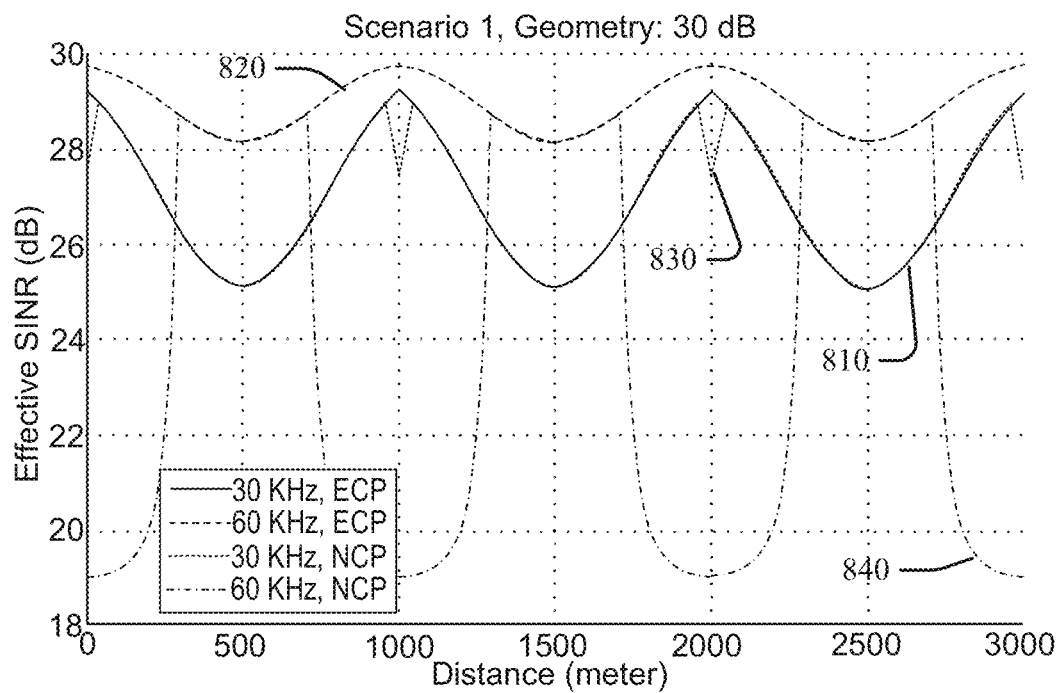
FIG. 8 illustrates the performance of various numerologies in a HST network deployment.
Figure 8:
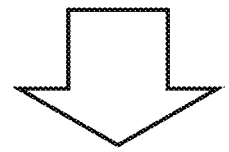
Figure 8:
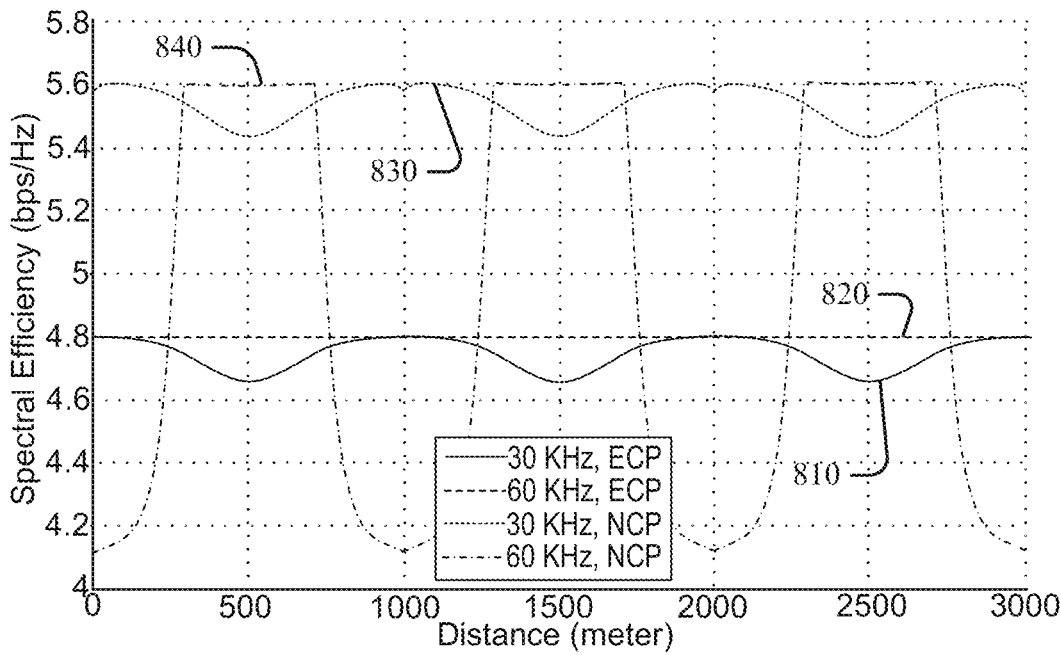

FIG. 8 illustrates the performance of various numerologies in a HST network deployment. In an aspect, the HST network deployment may use two consecutive SCS of a scalable numerology family, and two options of CP percentage (e.g., NCP and ECP) (total 4 combinations) to transmit in different regions of the rail track and for different users. As an example, a first numerology 810 may have a SCS of 30 kHz and an extended cyclic prefix resulting in a cyclic prefix ratio of 25%. A second numerology 820 may have an SCS of 30 kHz and an extended cyclic prefix resulting in a cyclic prefix ratio of 25%. Accordingly, the second numerology 820 may be a scaled numerology of the first numerology. That is, 30 kHz may be considered the basic SCS in this example. A third numerology may have an SCS of 30 kHz and a normal cyclic prefix resulting in a cyclic prefix ratio of 7%. A fourth numerology 840 may have an SCS of 60 kHz and a normal cyclic prefix resulting in a cyclic prefix ratio of 7%. As will be discussed in further detail below, the BBU 510 may select a numerology or each user based on the speed of the user, the location of the user inside the train, the location of the train, and the deployment topology. In an aspect, the HST network deployment may signal the available numerologies and corresponding codes so that a numerology for a time period may be signaled with only two bits.

As illustrated in FIG. 8, an effective SINR for the first numerology 810 may generally be better near the RRH 520 and drop between the RRH 520. The effective SINR for the second numerology 820 may similarly be better near the RRH 520 and drop between the RRH 520. In this example, the greater SCS may reduce the effects of Doppler spread and result in the second numerology producing a generally higher SINR than the first numerology. The third numerology 830 may be similar to the second numerology except produce slightly lower SINR near the RRH 520 where the shorter CP length of the normal cyclic prefix may not eliminate inter-symbol interference. The fourth numerology 840 may produce the most dramatic variations with poor SINR performance near the RRH due to the normal CP length applied to the shorter symbol period being less than the delay spread. Between the RRH 520, the fourth numerology 840 may be comparable with the second numerology 820 because the greater SCS may reduce the effects of Doppler spread. In this context, the effective SINR may refer to an SINR resulting after incorporating at least the interference induced by excessive delay spread beyond the CP (due to multipath), the intercarrier interference due to high mobility of the UE, and the geometry.

High SINR may not be the best metric to use for selecting a numerology. The higher CP ratios of the first numerology 810 and second numerology 820 may reduce the amount of data that can be transmitted. Accordingly, as shown in the bottom portion of FIG. 8, the first numerology 810 and the second numerology 820 may produce lower spectral efficiency. Therefore, although the second numerology 820 may produce the greatest absolute SINR, in this example, the third numerology 830 may produce the greatest spectral efficiency near the RRH 520 and the fourth numerology 840 may produce the greatest spectral efficiency between the RRH 520. The BBU 510 may, therefore, attempt to select the third numerology 830 when a UE 110 is near an RRH 520 and select the fourth numerology 840 when the UE is between RRH 520.

The BBU 510 may signal a numerology selection to the UE 110 for each time period (e.g., frame/subframe/slot/ mini-slot). In an aspect, adapting the numerology on a frame basis may be used for HST deployments with RRHs spaced on the order of 500 meters to 2000 meters. Finer granularity for adapting the numerology may be used when the RRH are closer together or with higher speeds. The BBU 510 may signal the numerology selection in a downlink control information (DCI) on a physical downlink common control channel (PDCCH).

In an aspect, the numerology selection may be specific for each UE 110. That is, the BBU 510 may determine the speed of the user, the location of the user inside the train, the location of the train, and/or the deployment topology. The BBU 510 may then select a numerology for the UE 110 and schedule the downlink transmission to the user to use the selected numerology. That is, the resource blocks or resource elements assigned to the UE 110 may use the selected numerology, which may be signaled to the UE 110 in the DCI. For MIMO transmissions and spatial multiplexing scenarios, the numerology selection may be determined also by the rank that the UE 110 is being scheduled. If a UE 110 is scheduled rank 2, then a different numerology, for example one that results in smaller interference due to Doppler and excessive delay spread, could be chosen than when a UE 110 receives a rank 1 transmission.

In another aspect, the numerology may be adapted for broadcast transmissions. For example, in order to provide all users on a train with acceptable service, TDM may be used to adapt the numerology. For example, the numerology may be switched every frame, subframe, or slot. Accordingly, all UEs on the train may receive an average channel and diversity due to the switching of numerologies. In another example, the second transmission may be a re-transmission (either simple repetition of some of the encoded bits of the first transmission, or a new redundancy version (RV), i.e., more parity bits) of the first transmission. The second transmission may be sent using a more conservative numerology, e.g., a numerology that has a larger CP ratio if the UE is expected to have large multipath, or a numerology that has a larger SCS if the UE has large Doppler spread, or both.

As another example, FDM may be used to adapt the numerology. The bandwidth may be split into two or more portions. One portion may transmit using a first numerology and a second portion may transmit using a second numerology. The BBU 510 may then schedule UEs 110 to receive one of the portions based on their location on the train and feedback from the UEs. For example, the UEs 110 may feedback Doppler estimates to the BBU 510. The BBU 510 may determine the location of the UE 110 on the train based on the Doppler estimates. Further, the bandwidth used for each portion may change dynamically to provide additional diversity. For example, a first numerology using 30 KHz SCS and NCP may be used for the upper half of the bandwidth and a second numerology using 60 KHz and NCP may be used for the lower half of the bandwidth in one frame, and then in the next frame, the numerologies have flipped for the portions of the bandwidth. All users that before were scheduled in the upper half of the bandwidth receiving 30 KHz NCP (e.g., users that are close to one of the RRH) will be now scheduled in the lower half of the BW. In an aspect, the adaptation of the numerology may be according to a predetermined numerology hopping mechanism/algorithm based on the UE ID or location on the rail track that will indicate which numerology (and thus which portion of BW) to use at each transmission. Accordingly, the UE 110 may determine which portion of BW to receive using which numerology without additional signaling. In an aspect, if only a subset of the numerology combinations are needed (e.g., NCP always provides better spectral efficiency for a deployment where delay spread is small compared to an extended CP (ECP) option), the CP ratio may be fixed and only the SCS may be adapted. In this case, only 1 bit is needed to signal the SCS change. It may also be possible to fix the SCS and adapt the CP ratio.

In an aspect, the selected numerology may also be used for uplink transmissions. The BBU 510 may signal a selected numerology when scheduling the UE 110 or the UE 110 may use the selected numerology for the downlink when transmitting on the uplink without further signaling. In another aspect, the UE 110 may transmit in the uplink using a different numerology than that used in the downlink, in which case the UE 110 signals to the BBU 510 the chosen numerology. UE selection of the numerology may be needed for example when the downlink transmits information using a higher rank transmission than the uplink, which is a more sensitive transmission method to interference compared to a rank one transmitted that may be used in the uplink.

Figure 9:
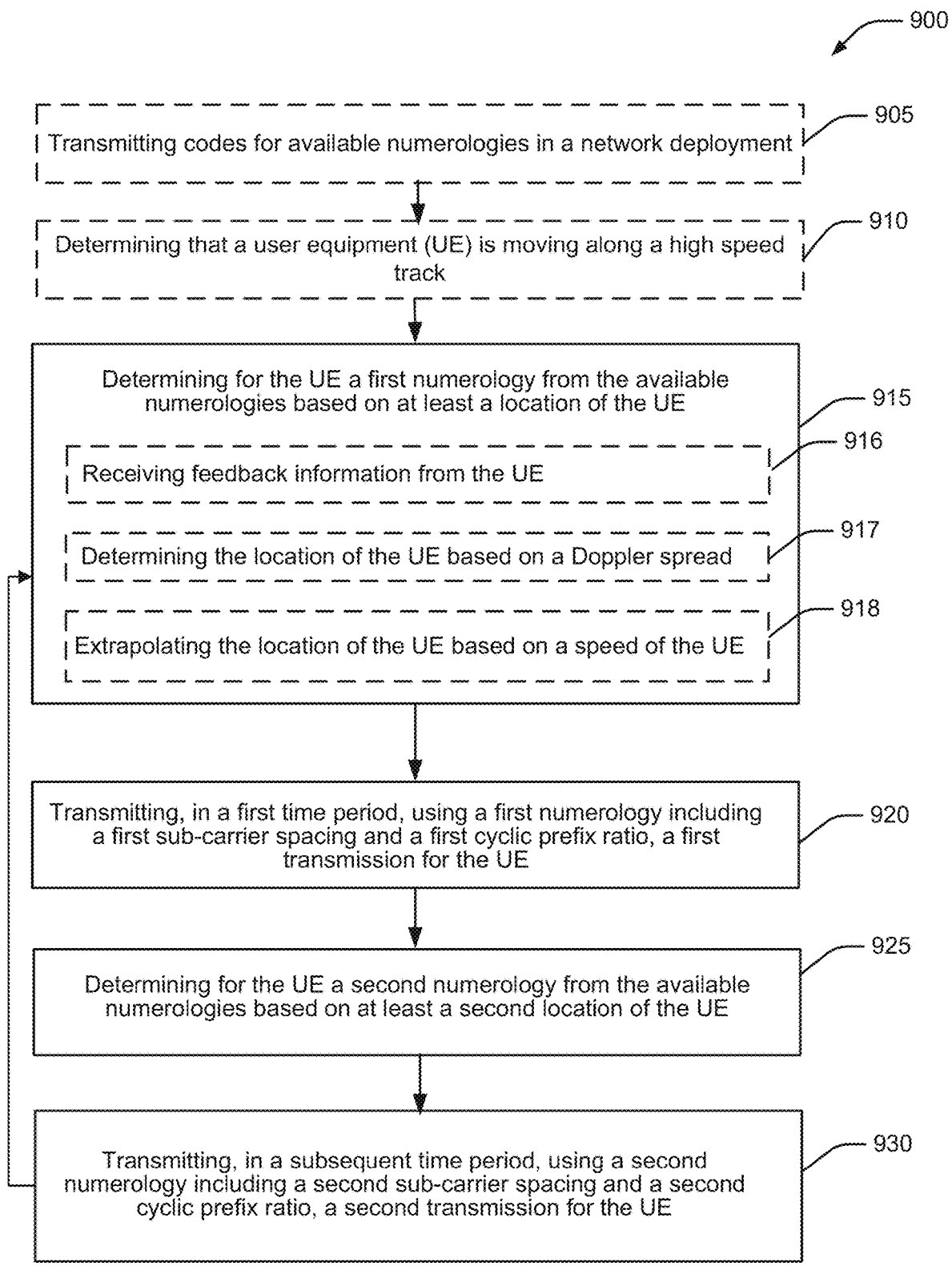
FIG. 9 is a flowchart of an example method of one technique for adaptation of transmission resources in wireless communication.

FIG. 9 is a flowchart of an example method 900 of resource adaptation for wireless communications. The method 900 may be performed using an apparatus (e.g., the base station 105 or the BBU 510, for example). Although the method 900 is described below with respect to the elements of the base station 105, other components may be used to implement one or more of the steps described herein.

In block 905, the method 900 may optionally include transmitting codes for available numerologies in a network deployment. In an aspect, for example, the transceiver component 186 may transmit the codes for available numerologies in the network deployment. In an aspect, the available numerologies may be configured by a network operator. In an aspect, the available numerologies may include at least four (4) combinations of a SCS and a CP ratio. The SCS for a second numerology may be scaled from a base SCS of a first numerology. In an aspect, one of the SCS or CP ratio may be fixed and only two numerologies may be available. The codes may be defined by a codebook mapping a one or two bit code to the available numerologies.

In block 910, the method 900 may include determining that a UE is moving along a high speed track. In an aspect, for example, the location component 182 may determine that the UE is moving along a high speed track. For example, the location component 182 may track locations reported by the UE 110 and compare the locations to locations of known high speed tracks to determine that the UE 110 is moving at a high speed between points on a known high speed track. In another example, the location component 182 may determine that the UE 110 is moving along a high speed track based on a history of serving base stations for the UE 110.

In block 915, the method 900 may include determining for the UE a first numerology from the available numerologies based on at least a location of the UE. In an aspect, for example, the numerology component 184 may determine the first numerology from the available numerologies based on at least the location of the UE 110. The location may be a predicted location of the UE 110 for a time period, e.g., a frame/sub-frame/slot for a transmission. The numerology component 184 may compare the location to a mapping for the network topology to determine an advantageous numerology for the location. In an aspect, determining the first numerology may include receiving feedback information from the UE, for example, in sub-block 916. In another aspect, for example in sub-block 917, determining the first numerology may include determining the location of the UE based on Doppler spread. In another aspect, for example in sub-block 918, determining the location of the UE may include extrapolating the location of the UE based on a speed of the UE.

In block 920, the method 900 may include transmitting, in a first time period, using a first numerology including a first subcarrier spacing and a first cyclic prefix ratio a first transmission for the UE. In an aspect, for example, the transceiver component 186 may transmit, in the first time period, using the first numerology including the first subcarrier spacing and the first cyclic prefix ratio the first transmission for the UE 110. The transceiver component 186 may also transmit an indication of the first numerology, for example, using a code identifying the first numerology.

In block 925, the method 900 may include determining for the UE a second numerology from the available numerologies based on at least a second location of the UE. In an aspect, for example, the numerology component 184 may determine for the UE the second numerology from the available numerologies based on at least the second location of the UE. The second location of the UE may be within the coverage area of the same base station 105, which may transmit and receive via multiple remote radio heads 520. The numerology component 184 may determine the second numerology in the same manner as discussed above regarding the first numerology in block 915. The second subcarrier spacing may be different than the first subcarrier spacing or the second cyclic prefix ratio may be different than the first cyclic prefix ratio.

In block 920, the method 900 may include transmitting, in a subsequent time period, using a second numerology including the second subcarrier spacing and the second cyclic prefix ratio, a second transmission for the UE. In an aspect, for example, the transceiver component 186 may transmit, in the subsequent time period, using the second numerology including the second subcarrier spacing and the second cyclic prefix ratio, the second transmission for the UE. The method 900 may return to block 915 and continue to adapt the numerology as the UE moves along the HST track.

Figure 10:
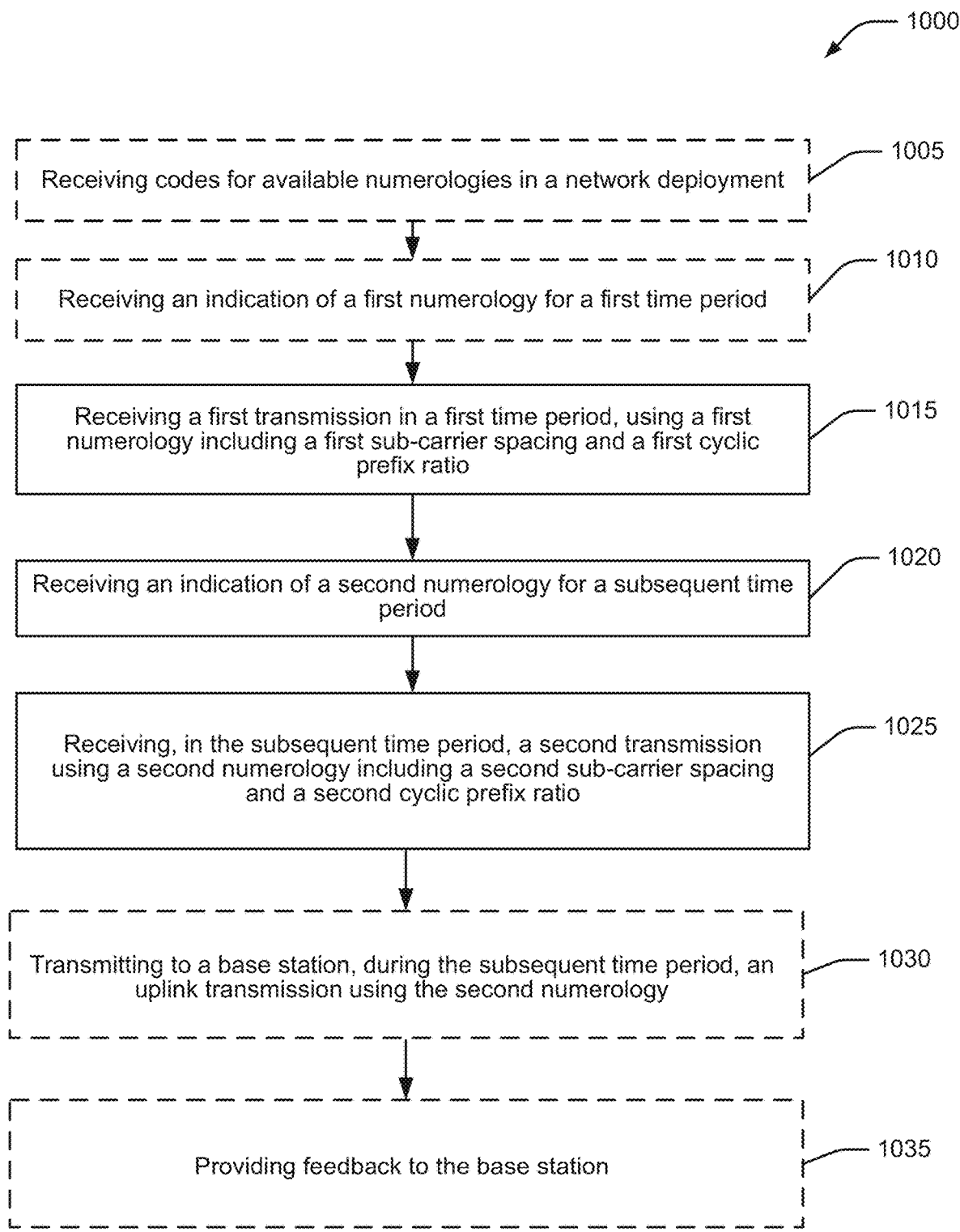
FIG. 10 is a flowchart of an example method of one technique for adaptation of transmission resources in wireless communication.

FIG. 10 is a flowchart of an example method 1000 of resource adaptation for wireless communications. The method 1000 may be performed using an apparatus (e.g., the UE 110, for example). Although the method 1000 is described below with respect to the elements of UE 110, other components may be used to implement one or more of the steps described herein.

In block 1005, the method 1000 may include receiving codes for available numerologies in a network deployment. In an aspect, for example, a transceiver component 176 and the numerology component 162 may receive codes for available numerologies in a network deployment. For example, the numerology component 162 may decode system information received by the transceiver component 176 on a broadcast channel.

In block 1010, the method 1000 may include receiving an indication of a first numerology for a first time period. In an aspect, for example, the transceiver component 176 and the numerology component 162 may receive the indication of the first numerology for the first time period. For example, the numerology component 162 may decode DCI received by the transceiver component 176 on a PDCCH.

In block 1015, the method 1000 may include receiving a first transmission in a first time period, using a first numerology including a first subcarrier spacing and a first cyclic prefix ratio. In an aspect, for example, the transceiver component 176 and the numerology component 162 may receive a first transmission in a first time period using a first numerology including a first subcarrier spacing and a first cyclic prefix ratio. For example, the numerology component 162 may decode a downlink transmission received by the transceiver component 176 on a physical downlink shared channel (PDSCH).

In block 1020, the method 1000 may include receiving an indication of a second numerology for a subsequent time period. In an aspect, for example, the transceiver component 176 and the numerology component 162 may receive the indication of the second numerology for the subsequent time period. For example, the numerology component 162 may decode DCI received by the transceiver component 176 on a PDCCH.

In block 1025, the method 1000 may include receiving, in the subsequent time period, a second transmission using a second numerology including a second subcarrier spacing and a second cyclic prefix ratio. In an aspect, for example, the transceiver component 176 and the numerology component 162 may receive in the subsequent time period, the second transmission using the second numerology including the second subcarrier spacing and the second cyclic prefix ratio. For example, the numerology component 162 may decode a downlink transmission received by the transceiver component 176 on a physical downlink shared channel (PDSCH) according to the second numerology.

In block 1030, the method 1000 may include transmitting, to a base station, during the subsequent time period, using the second numerology. In an aspect, for example, the transceiver component 176 may transmit, to the base station, during the subsequent time period using the second numerology. For example, the UE 110 may experience similar channel conditions for the reverse link. Accordingly, by using the second numerology during the subsequent time period for the uplink transmission, the base station may have improved performance for receiving the uplink transmission. More generally, the UE 110 may transmit using the selected numerology for a current time period. If however a high spectral efficiency is not needed on the uplink, then the UE may choose not to adapt the numerology and could signal or negotiate this with the BBU.

In block 1035, the method 1000 may include providing feedback to the base station. In an aspect, for example, the feedback component 170 may provide feedback to the base station. The feedback may include any information regarding location or channel conditions. For example, the feedback may include a Doppler spread and/or Doppler shifts determined by the Doppler component 172 or a location determined by the location component 174.

Figure 11:
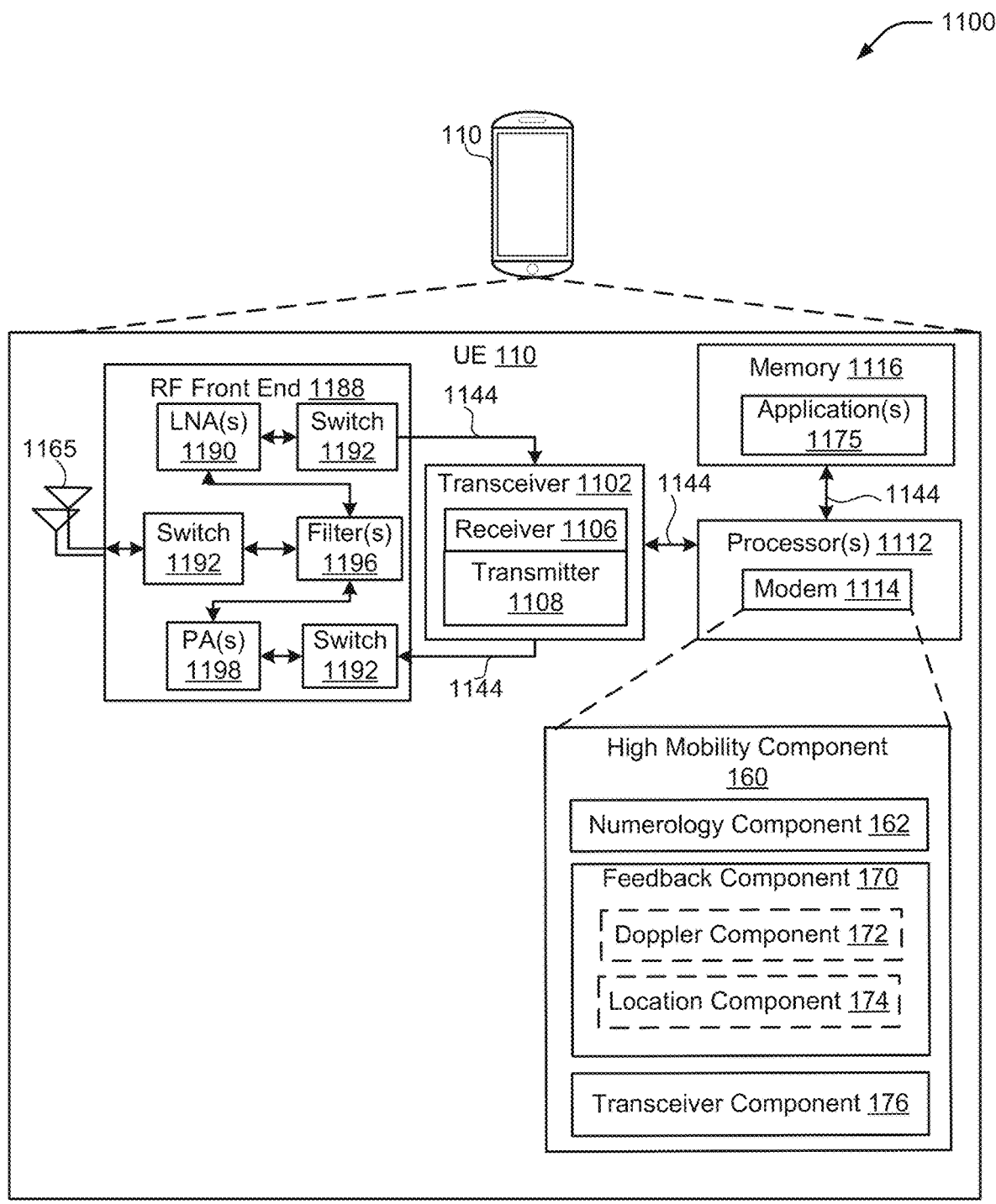
FIG. 11 is a schematic diagram of an aspect of an implementation of various components of the UE configured for communicating with the network entity, such as the base station, in accordance with various aspects of the present disclosure.

FIG. 11 schematically illustrates hardware components and subcomponents of the UE 110 for implementing one or more methods (e.g., method 1000) described herein in accordance with various aspects of the present disclosure. For example, one example of an implementation of UE 110 may include a variety of components, some of which have already been described above, but including components such as one or more processors 1112 and memory 1116 and transceiver 1102 in communication via one or more buses 1144, which may operate in conjunction with the high mobility component 160 to enable one or more of the functions described herein related to including one or more methods of the present disclosure. Further, the one or more processors 1112, modem 1114, memory 1116, transceiver 1102, RF front end 1188 and one or more antennas 1165, may be configured to support voice and/or data calls (simultaneously or non-simultaneously) in one or more radio access technologies.

In an aspect, the one or more processors 1112 can include a modem 1114 that uses one or more modem processors. The various functions related to high mobility component 160 may be included in modem 1114 and/or processors 1112 and, in an aspect, can be executed by a single processor, while in other aspects, different ones of the functions may be executed by a combination of two or more different processors. For example, in an aspect, the one or more processors 1112 may include any one or any combination of a modem processor, or a baseband processor, or a digital signal processor, or a transmit processor, or a receiver processor, or a transceiver processor associated with transceiver 1102. In other aspects, some of the features of the one or more processors 1112 and/or modem 1114 associated with high mobility component 160 may be performed by transceiver 1102.

Also, memory 1116 may be configured to store data used herein and/or local versions of applications or high mobility component 160 and/or one or more of its subcomponents being executed by at least one processor 1112. Memory 1116 can include any type of computer-readable medium usable by a computer or at least one processor 1112, such as random access memory (RAM), read only memory (ROM), tapes, magnetic discs, optical discs, volatile memory, non-volatile memory, and any combination thereof. In an aspect, for example, memory 1116 may be a non-transitory computer-readable storage medium that stores one or more computer-executable codes defining high mobility component 160 and/or one or more of its subcomponents, and/or data associated therewith, when UE 110 is operating at least one processor 1112 to execute UE high mobility component 160 and/or one or more of its subcomponents.

Transceiver 1102 may include at least one receiver 1106 and at least one transmitter 1108. The transceiver 1102 may be controlled by the transceiver component 176. Receiver 1106 may include hardware, firmware, and/or software code executable by a processor for receiving data, the code comprising instructions and being stored in a memory (e.g., computer-readable medium). Receiver 1106 may be, for example, a radio frequency (RF) receiver. In an aspect, receiver 1106 may receive signals transmitted by at least one base station 105. Additionally, receiver 1106 may process such received signals, and also may obtain measurements of the signals, such as, but not limited to, Ec/Io, SNR, RSRP, RSSI, etc. Transmitter 1108 may include hardware, firmware, and/or software code executable by a processor for transmitting data, the code comprising instructions and being stored in a memory (e.g., computer-readable medium). A suitable example of transmitter 1108 may including, but is not limited to, an RF transmitter.

Moreover, in an aspect, UE 110 may include RF front end 1188, which may operate in communication with one or more antennas 1165 and transceiver 1102 for receiving and transmitting radio transmissions, for example, wireless communications transmitted by at least one base station 105 or wireless transmissions transmitted by UE 110. RF front end 1188 may be connected to one or more antennas 1165 and can include one or more low-noise amplifiers (LNAs) 1190, one or more switches 1192, one or more power amplifiers (PAs) 1198, and one or more filters 1196 for transmitting and receiving RF signals.

In an aspect, LNA 1190 can amplify a received signal at a desired output level. In an aspect, each LNA 1190 may have a specified minimum and maximum gain values. In an aspect, RF front end 1188 may use one or more switches 1192 to select a particular LNA 1190 and its specified gain value based on a desired gain value for a particular application.

Further, for example, one or more PA(s) 1198 may be used by RF front end 1188 to amplify a signal for an RF output at a desired output power level. In an aspect, each PA 1198 may have specified minimum and maximum gain values. In an aspect, RF front end 1188 may use one or more switches 1192 to select a particular PA 1198 and its specified gain value based on a desired gain value for a particular application.

Also, for example, one or more filters 1196 can be used by RF front end 1188 to filter a received signal to obtain an input RF signal. Similarly, in an aspect, for example, a respective filter 1196 can be used to filter an output from a respective PA 1198 to produce an output signal for transmission. In an aspect, each filter 1196 can be connected to a specific LNA 1190 and/or PA 1198. In an aspect, RF front end 1188 can use one or more switches 1192 to select a transmit or receive path using a specified filter 1196, LNA 1190, and/or PA 1198, based on a configuration as specified by transceiver 1102 and/or processor 1112.

As such, transceiver 1102 may be configured to transmit and receive wireless signals through one or more antennas 1165 via RF front end 1188. In an aspect, transceiver may be tuned to operate at specified frequencies such that UE 110 can communicate with, for example, one or more base stations 105 or one or more cells associated with one or more base stations 105. In an aspect, for example, modem 1114 can configure transceiver 1102 to operate at a specified frequency and power level based on the UE configuration of the UE 110 and the communication protocol used by modem 1114. Additionally, as described herein, the transceiver 1102 may be configured to operate using a specified numerology during a time period and may change numerologies for use in different time periods.

In an aspect, modem 1114 can be a multiband-multimode modem, which can process digital data and communicate with transceiver 1102 such that the digital data is sent and received using transceiver 1102. In an aspect, modem 1114 can be multiband and be configured to support multiple frequency bands for a specific communications protocol. In an aspect, modem 1114 can be multimode and be configured to support multiple operating networks and communications protocols. In an aspect, modem 1114 can control one or more components of UE 110 (e.g., RF front end 1188, transceiver 1102) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 12:
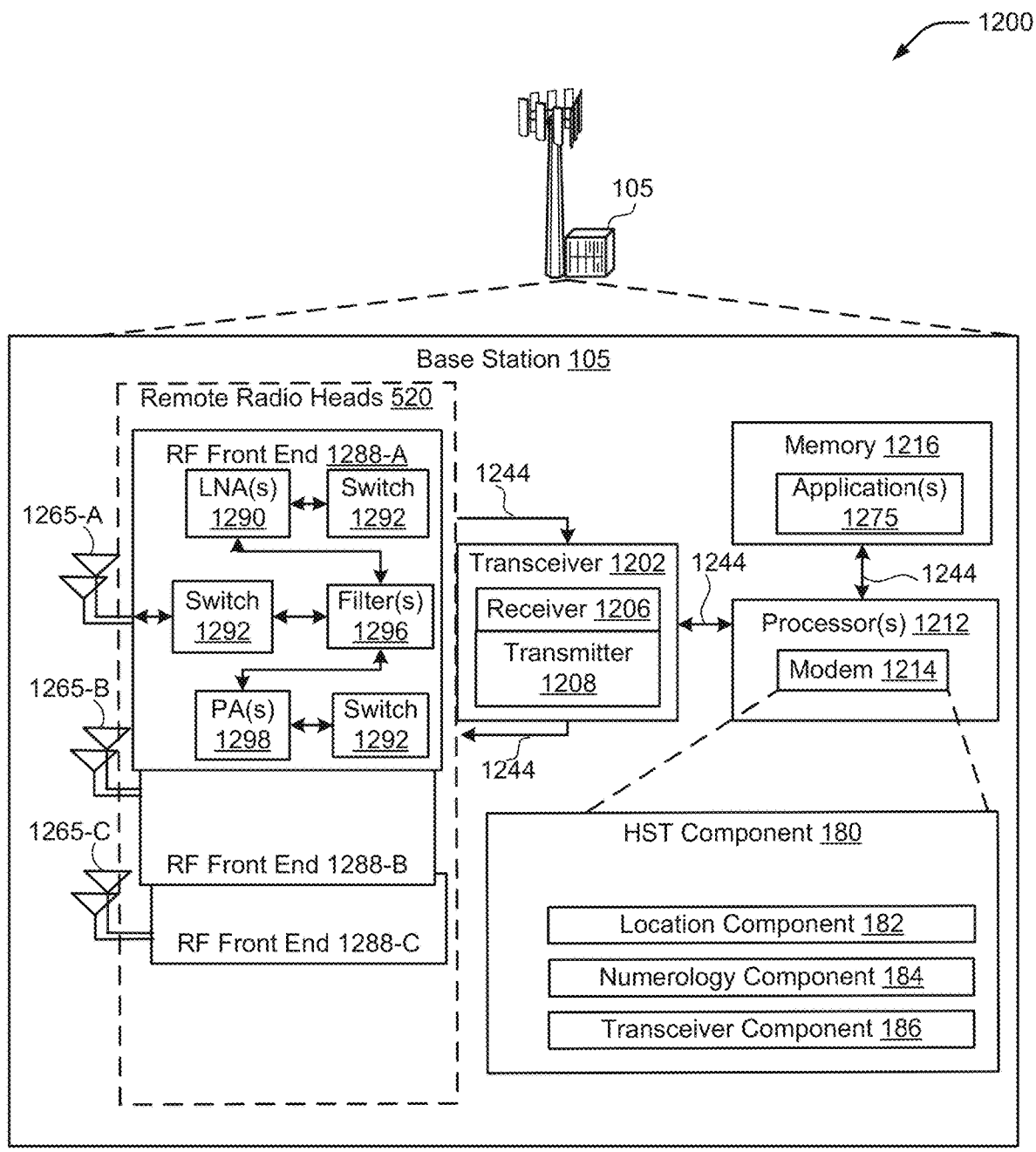
FIG. 12 is a schematic diagram of an aspect of an implementation of various components of the base station configured for communicating with the network entity, such as the base station, in accordance with various aspects of the present disclosure.

FIG. 12 schematically illustrates hardware components and subcomponents of the base station 105 for implementing one or more methods (e.g., method 900) described herein in accordance with various aspects of the present disclosure. In an aspect, the base station 105 may be configured as the BBU 510 controlling a plurality of remote radio heads 520. For example, one example of an implementation of base station 105 may include a variety of components, some of which have already been described above, but including components such as one or more processors 1212 and memory 1216 and transceiver 1202 in communication via one or more buses 1244, which may operate in conjunction with the HST component 180 to enable one or more of the functions described herein related to including one or more methods of the present disclosure. Further, the one or more processors 1212, modem 1214, memory 1216, transceiver 1202, RF front end 1288, and one or more antennas 1265, may be configured to support voice and/or data calls (simultaneously or non-simultaneously) in one or more radio access technologies.

In an aspect, the one or more processors 1212 can include a modem 1214 that uses one or more modem processors. The various functions related to HST component 180 may be included in modem 1214 and/or processors 1212 and, in an aspect, can be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with transceiver 1202. In other aspects, some of the features of the one or more processors 1212 and/or modem 1214 associated with HST component 180 may be performed by transceiver 1202. For example, the transceiver 1202 may implement any functions associated with the transceiver component 186. In an aspect, the transceiver component 186 may be a computer-readable medium storing instructions for controlling the transceiver 1202.

Also, memory 1216 may be configured to store data used herein and/or local versions of applications or HST component 180 and/or one or more of its subcomponents being executed by at least one processor 1212. Memory 1216 can include any type of computer-readable medium usable by a computer or at least one processor 1212, such as random access memory (RAM), read only memory (ROM), tapes, magnetic discs, optical discs, volatile memory, non-volatile memory, and any combination thereof. In an aspect, for example, memory 1216 may be a non-transitory computer-readable storage medium that stores one or more computer-executable codes defining HST component 180 and/or one or more of its subcomponents, and/or data associated therewith, when base station 105 is operating at least one processor 1212 to execute HST component 180 and/or one or more of its subcomponents.

Transceiver 1202 may include at least one receiver 1206 and at least one transmitter 1208. Receiver 1206 may include hardware, firmware, and/or software code executable by a processor for receiving data, the code comprising instructions and being stored in a memory (e.g., computer-readable medium). Receiver 1206 may be, for example, a radio frequency (RF) receiver. In an aspect, receiver 1206 may receive signals transmitted by at least one UE 110. Additionally, receiver 1206 may process such received signals, and also may obtain measurements of the signals, such as, but not limited to, Ec/Io, SNR, RSRP, RSSI, etc. Transmitter 1208 may include hardware, firmware, and/or software code executable by a processor for transmitting data, the code comprising instructions and being stored in a memory (e.g., computer-readable medium). A suitable example of transmitter 1208 may including, but is not limited to, an RF transmitter.

Moreover, in an aspect, base station 105 may include one or more RF front ends 1288, which may operate in communication with one or more antennas 1265 and transceiver 1202 for receiving and transmitting radio transmissions, for example, wireless communications transmitted by base station 105 or wireless transmissions transmitted by at least one UE 110. In an aspect, each RF front end 1288 may be located in a remote radio head 520. RF front end 1288 may be connected to one or more antennas 1265 and can include one or more low-noise amplifiers (LNAs) 1290, one or more switches 1292, one or more power amplifiers (PAs) 1298, and one or more filters 1296 for transmitting and receiving RF signals.

In an aspect, LNA 1290 can amplify a received signal at a desired output level. In an aspect, each LNA 1290 may have a specified minimum and maximum gain values. In an aspect, RF front end 1288 may use one or more switches 1292 to select a particular LNA 1290 and its specified gain value based on a desired gain value for a particular application.

Further, for example, one or more PA(s) 1298 may be used by RF front end 1288 to amplify a signal for an RF output at a desired output power level. In an aspect, each PA 1298 may have specified minimum and maximum gain values. In an aspect, RF front end 1288 may use one or more switches 1292 to select a particular PA 1298 and its specified gain value based on a desired gain value for a particular application.

Also, for example, one or more filters 1296 can be used by RF front end 1288 to filter a received signal to obtain an input RF signal. Similarly, in an aspect, for example, a respective filter 1296 can be used to filter an output from a respective PA 1298 to produce an output signal for transmission. In an aspect, each filter 1296 can be connected to a specific LNA 1290 and/or PA 1298. In an aspect, RF front end 1288 can use one or more switches 1292 to select a transmit or receive path using a specified filter 1296, LNA 1290, and/or PA 1298, based on a configuration as specified by transceiver 1202 and/or processor 1212.

As such, transceiver 1202 may be configured to transmit and receive wireless signals through one or more antennas 1265 via RF front ends 1288. In an aspect, transceiver may be tuned to operate at specified frequencies such that base station 105 can communicate with, for example, one or more UEs 110. In an aspect, for example, modem 1214 can configure transceiver 1202 to operate at a specified frequency and power level based on a configuration of base station 105 and the communication protocol used by modem 1214.

In an aspect, modem 1214 can be a multiband-multimode modem, which can process digital data and communicate with transceiver 1202 such that the digital data is sent and received using transceiver 1202. In an aspect, modem 1214 can be multiband and be configured to support multiple frequency bands for a specific communications protocol. In an aspect, modem 1214 can be multimode and be configured to support multiple operating networks and communications protocols. In an aspect, modem 1214 can control one or more components of base station 105 (e.g., RF front end 1288, transceiver 1202) to enable transmission and/or reception of signals from one or more UEs 110 based on a specified modem configuration. In an aspect, the modem configuration can be based on the mode of the modem and the frequency band in use.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of resource adaptation for wireless communications, comprising, by a user equipment (UE):

receiving a first transmission in a first time period using a first portion of bandwidth that transmits with a first numerology including a first subcarrier spacing and a first cyclic prefix ratio;

receiving an indication for a subsequent time period, wherein receiving the indication comprises decoding a downlink control information (DCI), wherein the DCI indicates which portion of bandwidth to receive, wherein a second portion of bandwidth transmits with a second numerology including a second subcarrier spacing and a second cyclic prefix ratio; and receiving, in the subsequent time period, a second transmission using the second portion of bandwidth, wherein the second transmission is a retransmission of the first transmission, wherein the second subcarrier spacing is greater than the first subcarrier spacing or the second cyclic prefix ratio is greater than the first cyclic prefix ratio, or both.

2. The method of claim 1, wherein the first transmission includes an indication of the first subcarrier spacing and the first cyclic prefix ratio.

3. The method of claim 1, wherein the second subcarrier spacing is twice the first subcarrier spacing.

4. The method of claim 1, further comprising transmitting to a base station, during the subsequent time period, an uplink transmission using the second numerology.

5. The method of claim 4, further comprising providing feedback to the base station, wherein the feedback includes at least one of a Doppler spread or Doppler shift.

6. The method of claim 1, further comprising receiving codes for available numerologies in a network deployment.

7. The method of claim 6, wherein receiving the codes comprises decoding system information.

8. An apparatus for wireless communications, comprising:
a memory storing computer-executable instructions; and
at least one processor coupled with the memory and configured to execute the instructions to:
receive a first transmission in a first time period using a first portion of bandwidth that transmits with a first numerology including a first subcarrier spacing and a first cyclic prefix ratio;
receive an indication for a subsequent time period, wherein receiving the indication comprises decoding a downlink control information (DCI), wherein the DCI indicates which portion of bandwidth to receive, wherein a second portion of bandwidth transmits with a second numerology including a second subcarrier spacing and a second cyclic prefix ratio; and
receive, in the subsequent time period, a second transmission using the second portion of bandwidth, wherein the second transmission is a retransmission of the first transmission, wherein the second subcarrier spacing is greater than the first subcarrier spacing or the second cyclic prefix ratio is greater than the first cyclic prefix ratio, or both.

9. The apparatus of claim 8, wherein the first transmission includes an indication of the first subcarrier spacing and the first cyclic prefix ratio.

10. The apparatus of claim 8, wherein the second subcarrier spacing is twice the first subcarrier spacing.

11. The apparatus of claim 8, wherein the at least one processor is configured to transmit, to a base station, during the subsequent time period, an uplink transmission using the second numerology.

12. The apparatus of claim 11, wherein the at least one processor is configured to provide feedback to the base station, wherein the feedback includes at least one of a Doppler spread or Doppler shift.

13. The apparatus of claim 8, wherein the at least one processor is configured to receive codes for available numerologies in a network deployment.

14. The apparatus of claim 13, wherein the at least one processor is configured to receive the codes by decoding system information.

15. An apparatus for resource adaptation for wireless communications, comprising:
means for receiving a first transmission in a first time period using a first portion of bandwidth that transmits with a first numerology including a first subcarrier spacing and a first cyclic prefix ratio;
means for receiving an indication for a subsequent time period, wherein receiving the indication comprises decoding a downlink control information (DCI), wherein the DCI indicates which portion of bandwidth to receive, wherein a second portion of bandwidth transmits with a second numerology including a second subcarrier spacing and a second cyclic prefix ratio; and
means for receiving, in the subsequent time period, a second transmission using the second portion of bandwidth, wherein the second transmission is a retransmission of the first transmission, wherein the second subcarrier spacing is greater than the first subcarrier spacing or the second cyclic prefix ratio is greater than the first cyclic prefix ratio, or both.

16. The apparatus of claim 15, wherein the first transmission includes an indication of the first subcarrier spacing and the first cyclic prefix ratio.

17. The apparatus of claim 15, wherein the second subcarrier spacing is twice the first subcarrier spacing.

18. The apparatus of claim 15, further comprising means for transmitting to a base station, during the subsequent time period, an uplink transmission using the second numerology.

19. The apparatus of claim 15, further comprising means for providing feedback to a base station, wherein the feedback includes at least one of a Doppler spread or Doppler shift.

20. The apparatus of claim 15, further comprising means for receiving codes for available numerologies in a network deployment.

21. The apparatus of claim 20, wherein the means for receiving the codes is configured to decode system information.

22. A non-transitory computer-readable medium storing computer-executable instructions to:
receive a first transmission in a first time period using a first portion of bandwidth that transmits with a first numerology including a first subcarrier spacing and a first cyclic prefix ratio;
receive an indication for a subsequent time period, wherein receiving the indication comprises decoding a downlink control information (DCI), wherein the DCI indicates which portion of bandwidth to receive, wherein a second portion of bandwidth transmits with a second numerology including a second subcarrier spacing and a second cyclic prefix ratio; and
receive, in the subsequent time period, a second transmission using the second portion of bandwidth, wherein the second transmission is a retransmission of the first transmission, wherein the second subcarrier spacing is greater than the first subcarrier spacing or the second cyclic prefix ratio is greater than the first cyclic prefix ratio, or both.

23. The non-transitory computer-readable medium of claim 22, wherein the first transmission includes an indication of the first subcarrier spacing and the first cyclic prefix ratio.

24. The non-transitory computer-readable medium of claim 22, wherein the second subcarrier spacing is twice the first subcarrier spacing.

25. The non-transitory computer-readable medium of claim 22, further comprising code to transmit to a base station, during the subsequent time period, an uplink transmission using the second numerology.

26. The non-transitory computer-readable medium of claim 22, further comprising code to provide feedback to a base station, wherein the feedback includes at least one of a Doppler spread or Doppler shift.

27. The non-transitory computer-readable medium of claim 22, further comprising code to receive codes for available numerologies in a network deployment.

28. The non-transitory computer-readable medium of claim 27, wherein the code to receive the codes is configured to decode system information.

\* \* \* \* \*